(12) United States Patent
Koo et al.

(10) Patent No.: US 10,421,515 B2
(45) Date of Patent: Sep. 24, 2019

(54) SMALL MOBILITY VEHICLE CAPABLE OF CHANGING DRIVING MODE THEREOF

(71) Applicants: HYUNDAI MOTOR COMPANY, Seoul (KR); KIA MOTORS CORPORATION, Seoul (KR)

(72) Inventors: Dong Han Koo, Seoul (KR); Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 135 days.

(21) Appl. No.: 15/808,480

(22) Filed: Nov. 9, 2017

(65) Prior Publication Data

US 2019/0009853 A1  Jan. 10, 2019

(30) Foreign Application Priority Data

Jul. 4, 2017 (KR) ......................... 10-2017-0084726

(51) Int. Cl.

| | |
|---|---|
| *B62D 61/08* | (2006.01) |
| *B62K 5/027* | (2013.01) |
| *B62J 25/00* | (2006.01) |
| *B62K 5/05* | (2013.01) |
| *B62K 15/00* | (2006.01) |
| *B62M 7/12* | (2006.01) |
| *B62K 5/06* | (2006.01) |

(52) U.S. Cl.
CPC .............. *B62K 5/027* (2013.01); *B62J 25/00* (2013.01); *B62K 5/05* (2013.01); *B62K 5/06* (2013.01); *B62K 15/008* (2013.01); *B62M 7/12* (2013.01); *B62K 2204/00* (2013.01); *B62K 2208/00* (2013.01)

(58) Field of Classification Search
CPC . B62K 5/027; B62K 5/05; B62K 5/06; B62K 15/008; B62K 2204/00; B62K 2208/00; B62J 25/00; B62M 7/12
USPC ........................................ 180/208, 210, 213
See application file for complete search history.

(56) References Cited

U.S. PATENT DOCUMENTS

| | | | |
|---|---|---|---|
| 6,402,174 B1 * | 6/2002 | Maurer .................. | B62K 3/005 280/266 |
| 8,226,104 B2 * | 7/2012 | Kulikov ................. | B62K 3/002 280/287 |

(Continued)

FOREIGN PATENT DOCUMENTS

| | | |
|---|---|---|
| KR | 101531278 B1 | 6/2015 |
| WO | WO2016082399 A1 | 6/2016 |

*Primary Examiner* — Toan C To
(74) *Attorney, Agent, or Firm* — Brinks Gilson & Lione (57) ABSTRACT

The present disclosure provides a small mobility vehicle including: a base unit including a footplate and a plurality of driving wheels mounted on the footplate, a first column unit having a first plurality of links hinged to another link of the first plurality of links, wherein the footplate is coupled to a lower end of a lower link of the first plurality of links and steering handlebars are coupled to an upper end of an upper link of the first plurality of links, and a second column unit capable of being folded or unfolded that has a second plurality of links hinged to another link of the second plurality of links, wherein a lower end of a first link of the second plurality of links is hinged to the footplate and an auxiliary wheel is coupled to one end of a second link of the second plurality of links.

13 Claims, 4 Drawing Sheets

(56) References Cited

U.S. PATENT DOCUMENTS

| | | | |
|---|---|---|---|
| 8,535,206 B2* | 9/2013 | Kraus | A63B 22/001 |
| | | | 280/210 |
| 9,469,366 B2 | 10/2016 | Wang et al. | |
| 2004/0130126 A1* | 7/2004 | Di Blasi | B62K 5/027 |
| | | | 280/639 |
| 2005/0236803 A1* | 10/2005 | Summers | B62K 5/05 |
| | | | 280/282 |
| 2015/0209205 A1* | 7/2015 | Ransenberg | B62K 15/008 |
| | | | 280/641 |
| 2016/0236744 A1* | 8/2016 | Bailie | B62K 3/02 |
| 2017/0073032 A1* | 3/2017 | Mei | B62K 15/008 |
| 2017/0361893 A1* | 12/2017 | Lee | B62K 15/008 |
| 2018/0056152 A1* | 3/2018 | Reimers | A63B 55/61 |
| 2018/0271726 A1* | 9/2018 | Wang | A61G 5/0841 |
| 2019/0023347 A1* | 1/2019 | Block | B62K 5/025 |

\* cited by examiner

SMALL MOBILITY VEHICLE CAPABLE OF CHANGING DRIVING MODE THEREOF

CROSS-REFERENCE TO RELATED APPLICATION

The present application claims priority to and the benefit of Korean Patent Application No. 10-2017-0084726, filed on Jul. 4, 2017, which is incorporated herein by reference in its entirety.

FIELD

The present disclosure relates to a small mobility vehicle capable of changing a driving mode thereof, and more particularly to a small mobility vehicle capable of changing a driving mode thereof between a two-wheel driving mode and a three-wheel driving mode depending on driving conditions.

BACKGROUND

The statements in this section merely provide background information related to the present disclosure and may not constitute prior art.

Recently, various mobility vehicles using electricity such as scooters, bicycles or electric transportation devices have been developed. Since electric transportation devices are environmentally friendly in that they do not produce harmful emissions and can be more compact, the electric transportation devices are becoming more popular as personal transportation devices. Such personal transportation devices may be very useful and convenient on busy city streets concerning its speed, compactness, and mobility.

The personal transportation device includes a riding unit, occupied by a rider, a driving unit, and a steering unit. The riding unit may be configured as a footplate, on which the rider stands, or a seat on which the rider sits. The driving unit may include driving wheels, an electric motor for driving the driving wheels, and a battery for supplying electric power to the electric motor. The steering unit may be configured as handlebars, which the rider directly holds for steering, or a sensor for sensing a center of gravity, a tilt or the like.

In particular, as a personal transportation device, various kinds of two-wheeled personal mobility vehicles have been released on the market. The two-wheeled mobility vehicle has a turning radius equal to zero so that it may be able to move freely in a narrow space.

Such a two-wheeled mobility vehicle may further include a control mechanism to stabilize the physically unstable structure. However, in the event of breakdown or malfunction of the control mechanism, the rider may be susceptible to a risk of injury. Therefore, the two-wheeled mobility vehicle may not be appropriate for high-speed travel.

Meanwhile, a three-wheeled mobility vehicle may be more physically stable than the two-wheeled mobility vehicle, but the turning radius may be relatively large as opposed to that of the two-wheeled mobility vehicle. Further, when the three-wheeled mobility vehicle turns at that turning radius, it may roll over due to centrifugal force.

SUMMARY

The present disclosure provides a small mobility vehicle capable of changing a driving mode thereof between a two-wheel driving mode and a three-wheel driving mode using a plurality of driving wheels and a foldable auxiliary wheel.

In some forms of the present disclosure, a small mobility vehicle may include: a base unit including a footplate and a plurality of driving wheels rotatably mounted on two opposite sides of the footplate, a first column unit having a first plurality of links arranged in series such that each link of the first plurality of links is and steering handlebars are coupled to an upper end of an upper link of the first plurality of links, and a second column unit having a second plurality of links arranged in series such that each link of the second plurality of links is hinged to another link of the second plurality of links, wherein: each link of the second plurality of links is capable of being folded or unfolded, a lower end of a first link of the second plurality of links is hinged to the footplate, and one end of a second link of the second plurality of links is rotatably coupled to an auxiliary wheel that is configured to touch a ground when all of the links of the second plurality of links are unfolded.

When the driving wheels rotate at the same speed, the small mobility vehicle may be configured to travel straight, and when the driving wheels rotate at different speeds, the small mobility vehicle may be configured to make a turn.

The auxiliary wheel of the second column unit may have a motor configured to steer the auxiliary wheel.

The small mobility vehicle may further include a seat provided between the second plurality of links of the second column unit.

The first link of the second plurality of links may be extended upwardly from a lower end of the first link when the second column unit is unfolded, and the first link of the second plurality of links is formed in a curve shape that is bent in a forward direction, where in an upper end of the first link is extended toward the first column unit.

The first link of the second plurality of link may include a third plurality of links that are configured to extend, and links of the second plurality of links other than the first link of the second plurality of links are positioned between links of the third plurality of links of the first link when the second column unit is folded.

The small mobility vehicle may further include a third link having one end connected to the other end of the second link, the third link being configured to lie parallel to the ground when the second column unit is unfolded, and a fourth link having one end connected to a portion between an upper end and a lower end of the first link and the other end connected to the other end of the third link.

The small mobility vehicle may further include a seat provided on the upper end of the first link, and a fifth link configured to support the seat when the second column unit is unfolded, wherein one end of the fifth link is coupled to a portion between the one end of the third link and the other end of the third link and the other end of the fifth link is coupled to the upper end of the first link.

When the second column unit is in a folded state, the second column unit may be coupled to the first column unit.

The second column unit may be coupled to the lower link of the first column unit.

The small mobility vehicle may further include a seat provided between the plurality of the links of the second column unit, wherein, when the second column unit is folded: the seat is configured to rotate on the links of the second column unit such that the seat is folded or unfolded, the first column unit may be positioned between the seat and the second column unit, and the seat may be coupled to the second column unit.

The small mobility vehicle may further include: a driving wheel link configured to connect the plurality of driving wheels including an upper portion or a lower portion from the center of any of the plurality of driving wheels and slide laterally such that the plurality of driving wheels are tilted at the same time, a tilting bar rotatably coupled to the footplate that is configured to extend in a forward and backward direction of the footplate, and a link-connecting bar configured to connect the tilting bar and the driving wheel link, wherein the tilting bar may be coupled to the lower link of the first column unit and is configured to rotate along with the link-connecting bar when the first column unit pivots, and wherein the plurality of the driving wheels are tilted when the driving wheel link slides laterally.

The first link of the second column unit may be coupled to the tilting bar, and the second column unit may be configured to tilt as the first link tilts.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
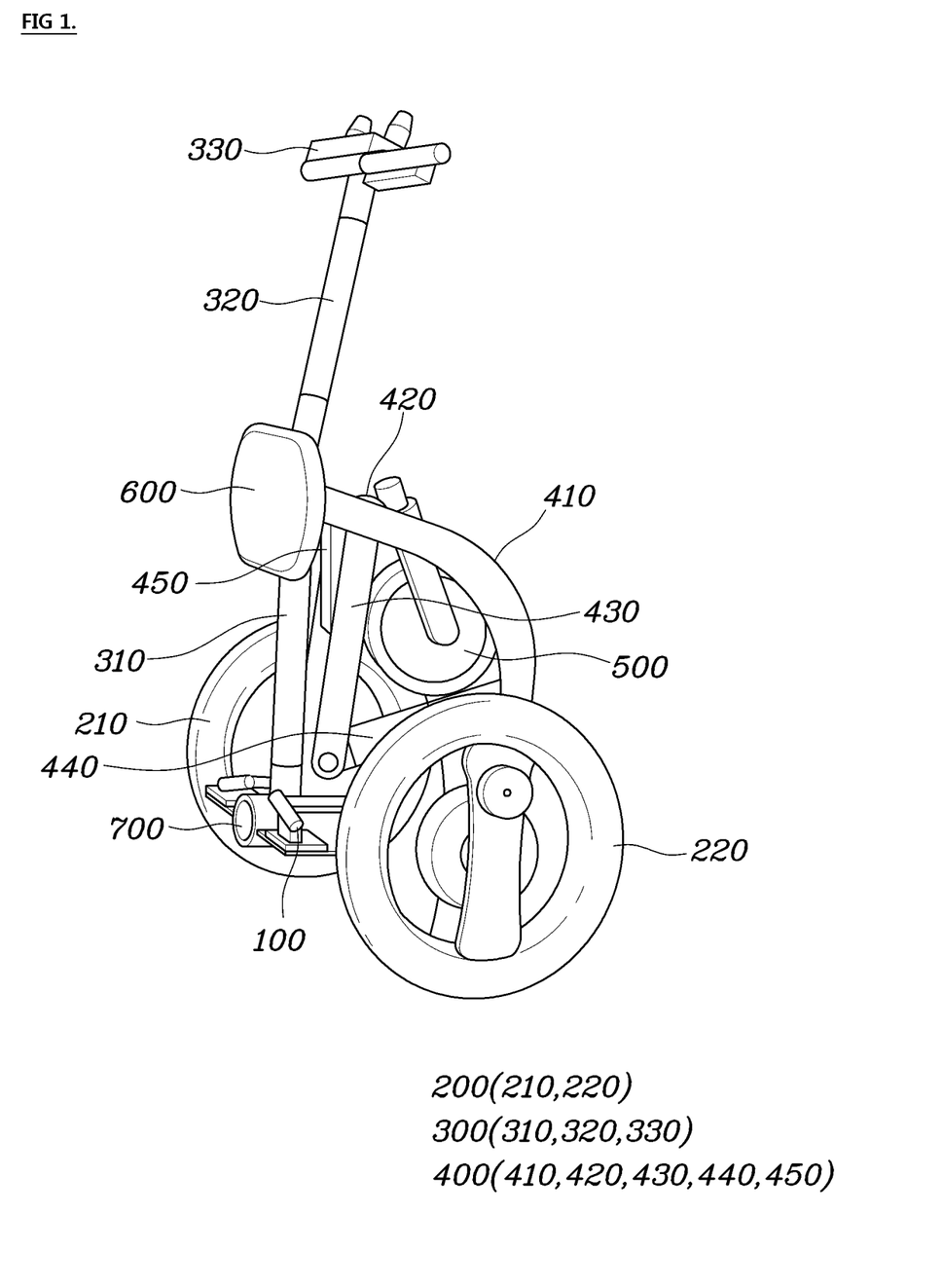
FIG. 1 is a perspective view illustrating a second column unit of a small mobility vehicle in a folded state.
Figure 2:
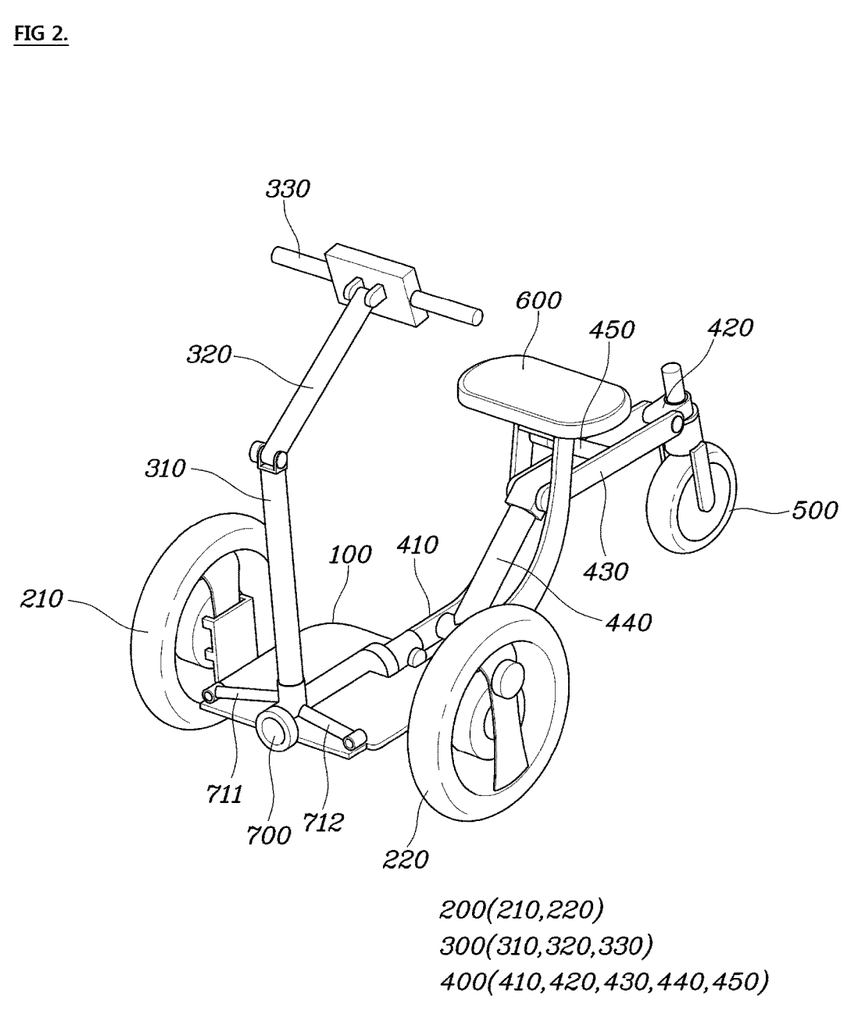
FIG. 2 is a perspective view illustrating the second column unit of the small mobility vehicle in an unfolded state.
Figure 3:
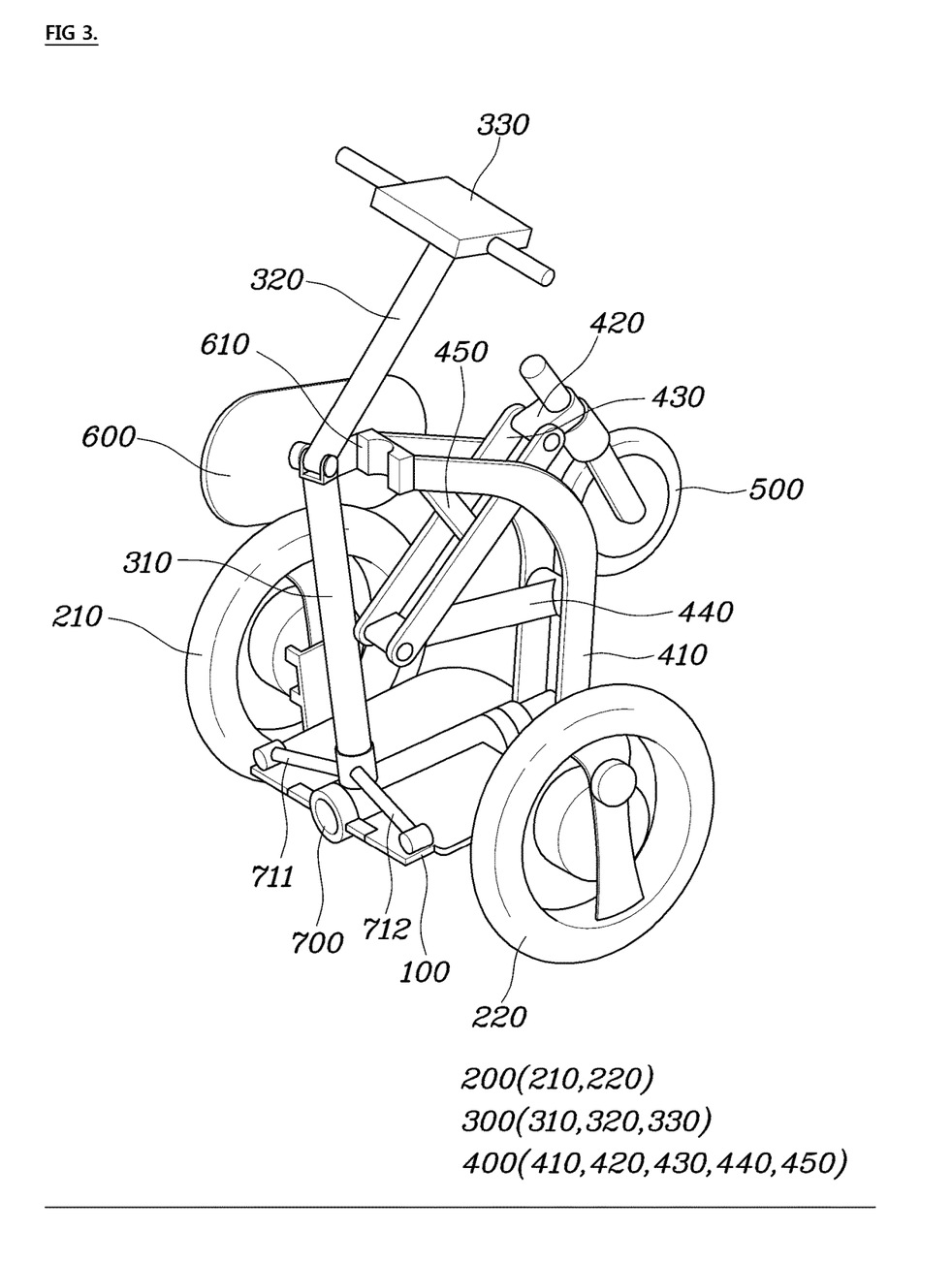
FIG. 3 is a perspective view illustrating the folding/unfolding operation of the second column unit of the small mobility vehicle.

Referring to FIGS. 1 to 3, a small mobility vehicle in some forms of the present disclosure includes a base unit, which includes a footplate 100 and a plurality of driving wheels 200 rotatably mounted to two opposite sides of the footplate 100, a first column unit 300, which includes a plurality of links, arranged in series so as to be hinged to each other and including an upper link 320, and steering handlebars 330 coupled to the upper end of the upper link 320, and a second column unit 400, which includes a plurality of links, arranged in series so as to be hinged to each other and including a first link 410 hinged at a lower end thereof to the footplate 100 and a second link 420 so as to be folded or unfolded by being rotated with respect to the footplate 100, and an auxiliary wheel 500 rotatably coupled to one end of the second link 420 and configured to be brought into contact with the ground when the links are unfolded through rotation thereof.

The base unit includes a footplate 100 and a plurality of driving wheels 200 rotatably mounted to two opposite sides of the footplate 100.

The footplate 100 may serve as a space on which the rider put his/her feet in a two-wheel driving mode or a three-wheel driving mode. The plurality of driving wheels 200 may include, for example, two driving wheels 210 and 220, which may be rotatably mounted to the left and right sides of the footplate 100. There may be further provided one or more driving units (not shown), which transmit rotating force to the driving wheels 200 to rotate the same. Even when the number of driving units (not shown) is one, the driving unit (not shown) may independently drive the driving wheels 200 in the manner of transmitting different magnitudes of rotating force to the wheels 200.

The first column unit 300 includes a plurality of links, which are arranged in series and are hinged to each other so as to be rotated. The plurality of links may include two links, namely an upper link 320 and a lower link 310. In the case in which the first column unit 300 includes the upper link 320 and the lower link 310, the upper link 320 and the lower link 310 may be directly and hinged to each other. Steering handlebars 330 may be coupled to the upper end of the upper link 320 so that the rider is capable of steering the small mobility vehicle using the same. The lower link 310 may be coupled to the footplate 100. The height of the first column unit 300 may be adjusted through rotation of the links thereof, which are hinged to each other. Specifically, the height of the first column unit 300 may be adjusted by rotating the upper link 320, which is hinged to the lower link 310, with respect to the lower link 310. There may be further provided an element for maintaining the upper link 320 in a stationary state after the rotation of the upper link 320. Here, the foregoing element may be configured as, for example, a stopper, which is interposed between the upper link 320 and the lower link 310.

The second column unit 400 includes a plurality of links, which are arranged in series and are hinged to each other so as to be rotated. The second column unit 400 may be folded or unfolded through rotation of the links thereof. Out of the two or more links of the second column unit 400, a first link 410 may be hinged at the lower end thereof to the footplate 100 so as to be rotated. An auxiliary wheel 500 is rotatably coupled to one end of a second link 420, out of the two or more links of the second column unit 400. In the case in which the second column unit 400 includes two links, namely the first link 410 and the second link 420, the upper end of the first link 410 may be directly and hinged to the opposite end of the second link 420. Alternatively, at least one intervening link may be further connected between the first link 410 and the second link 420.

When the second column unit 400 is folded, the first link 410 is rotated with respect to the footplate 100 so that the second column unit 400 approaches the first column unit 300 and is positioned above the footplate 100. Accordingly, when the driving mode is switched to a two-wheel driving mode through the folding of the second column unit 400, the center of gravity of the mobility vehicle is shifted backward, thereby ensuring the stability of the mobility vehicle.

When the second column unit 400 is unfolded, the links, including the first link 410, are rotated so that the auxiliary wheel 500 coupled to the second link 420 is brought into contact with the ground. Accordingly, the driving mode is switched to a three-wheel driving mode. The auxiliary wheel 500 may be configured to freely rotate using bearings, without the application of driving force from the driving unit thereto.

As such, the small mobility vehicle in some forms of the present disclosure, which has the above-described construction, is capable of changing the driving mode thereof between the two-wheel driving mode and the three-wheel driving mode in accordance with driving conditions.

When the driving wheels 210 and 220, which are positioned at the left and right sides of the footplate 100, rotate at the same speed as each other, the small mobility vehicle may travel straight. When the driving wheels 210 and 220 rotate at different speeds from each other, the small mobility vehicle may turn. The driving unit (not shown) for driving the driving wheels 200 may steer the small mobility vehicle by rotating the driving wheels 210 and 220 at different speeds from each other. In an example, each of in-wheel motors may be provided at a respective one of the driving wheels 210 and 220 so as to create a difference in rotating speed between the driving wheels 210 and 220. Instead of the in-wheel motors, if each of the motors is arranged in alignment with a shaft of a respective one of the driving wheels 210 and 220, the same effect can be obtained.

Here, the difference in rotating speed between the driving wheels 210 and 220 may be generated through detection of the rotation of the steering handlebars 330.

The auxiliary wheel 500, which is coupled to the one end of the second link 420 of the second column unit 400, may be provided with a motor (not shown) for steering the auxiliary wheel 500. The motor (not shown) may steer the auxiliary wheel 500 in response to the rotation of the steering handlebars 330.

A seat 600 may be provided between the links that constitute the second column unit 400. In the three-wheel driving mode, in which the second column unit 400 is in the unfolded state, a space for allowing the rider to sit on the seat 600 is formed. The seat 600 may be configured to be rotated or folded when the second column unit 400 is folded to be switched to the two-wheel driving mode.

The first link 410, which constitutes the second column unit 400, may be formed in the shape of a curve such that, in the folded state of the second column unit 400, the first link 410 extends upwards from the lower end thereof, which is connected to the footplate 100, and is bent in the forward direction so that the upper end thereof is located near the first column unit 300.

Accordingly, in the folded state of the second column unit 400, in order to allow the rider to comfortably get into the small mobility vehicle, the height of the second column unit 400 is maintained as low as possible, and the center of gravity of the second column unit 400 is shifted as forward as possible. Further, in the unfolded state of the second column unit 400, the first link 410 may be formed such that the upper end thereof is oriented upwards, and the seat 600 may be disposed on the upper end of the first link 410, thereby ensuring the stability of the mobility vehicle.

The first link 410, which constitutes the second column unit 400, may include a plurality of unit links, which are arranged parallel to each other so as to be spaced a predetermined distance apart from each other. When the second column unit 400 is folded, the other links of the second column unit 400 are rotated and positioned in the space between the unit links of the first link 410.

The reason for this structure is to minimize the space occupied by the second column unit 400 in order to minimize the inconvenience of the rider when the second column unit 400 is folded to be switched to the two-wheel driving mode.

At least one intervening link may be further provided between the first link 410 and the second link 420, which constitute the second column unit 400. In the example shown in FIGS. 1 to 3, three links may be further provided between the first link 410 and the second link 420. In other words, the second column unit 400 may include five links.

The second column unit 400 may further include a third link 430, which has one end connected to the opposite end of the second link 420 and is configured to lie parallel to the ground when the second column unit 400 is unfolded, and a fourth link 440, which has one end connected to a portion between the upper end and the lower end of the first link 410 and the opposite end connected to the opposite end of the third link 430.

When the second column unit 400 is unfolded, the third link 430 is rotated and lies parallel to the ground, whereby the total length of the unfolded second column unit 400 is maximized within a limited range determined by the length of the third link 430. The third link 430 may include a plurality of unit links, which are arranged parallel to each other so as to be spaced a predetermined distance apart from each other. When the second column unit 400 is folded, in order to allow the unit links of the third link 430 to be positioned in the space between the unit links of the first link 410, the distance between the unit links of the third link 430 may be set to be smaller than the distance between the unit links of the first link 410.

Since the fourth link 440 is disposed to connect the third link 430 and the first link 410 to each other therebetween and is hinged to the third link 430 and the first link 410, the fourth link 440 is rotated when the second column unit 400 is folded or unfolded.

The second column unit 400 may further include a fifth link 450, which has one end coupled to a portion between the one end and the opposite end of the third link 430 and the opposite end coupled to the upper end of the first link 410. When the second column unit 400 is in the unfolded state, the fifth link 450 may serve to support the seat 600, which is coupled to the upper end of the first link 410, so that the load applied to the seat 600 is evenly dispersed to the driving wheels 200 mounted to the footplate 100 and the auxiliary wheel 500.

When the second column unit 400 is folded, it may be coupled to the first column unit 300. The reason for this is to prevent the links of the second column unit 400 from being undesirably rotated and unfolded in the folded state of the second column unit 400 for the two-wheel driving mode. At this time, the second column unit 400 may be coupled to the lower link 310 of the first column unit 300. Because the upper link 320 of the first column unit 300 is configured to be rotated for adjustment of the height of the first column unit 300, it is desirable for the second column unit 400 to be coupled to the lower link 310, which extends upwards from the footplate 100.

Here, a coupling member 610 may be provided under the seat 600, which is provided between the links of the second column unit 400. In an example, the seat 600 may be disposed on the upper end of the first link 410, and may be configured to be rotated with respect to the first link 410 so as to be folded or unfolded. When the seat 600 is folded, the coupling member 610 may be exposed. Specifically, in the folded state of the second column unit 400, the seat 600 is rotated with respect to the first link 410 of the second column unit 400 so that a space is formed between the seat 600 and the first link 410 and the first column unit 300 is placed into the space, and subsequently is rotated again with respect to the first link 410 so as to be coupled back to the first link 410. In this way, the second column unit 400 may be secured to the first column unit 300 in the folded state of the second column unit 400.

Figure 4:
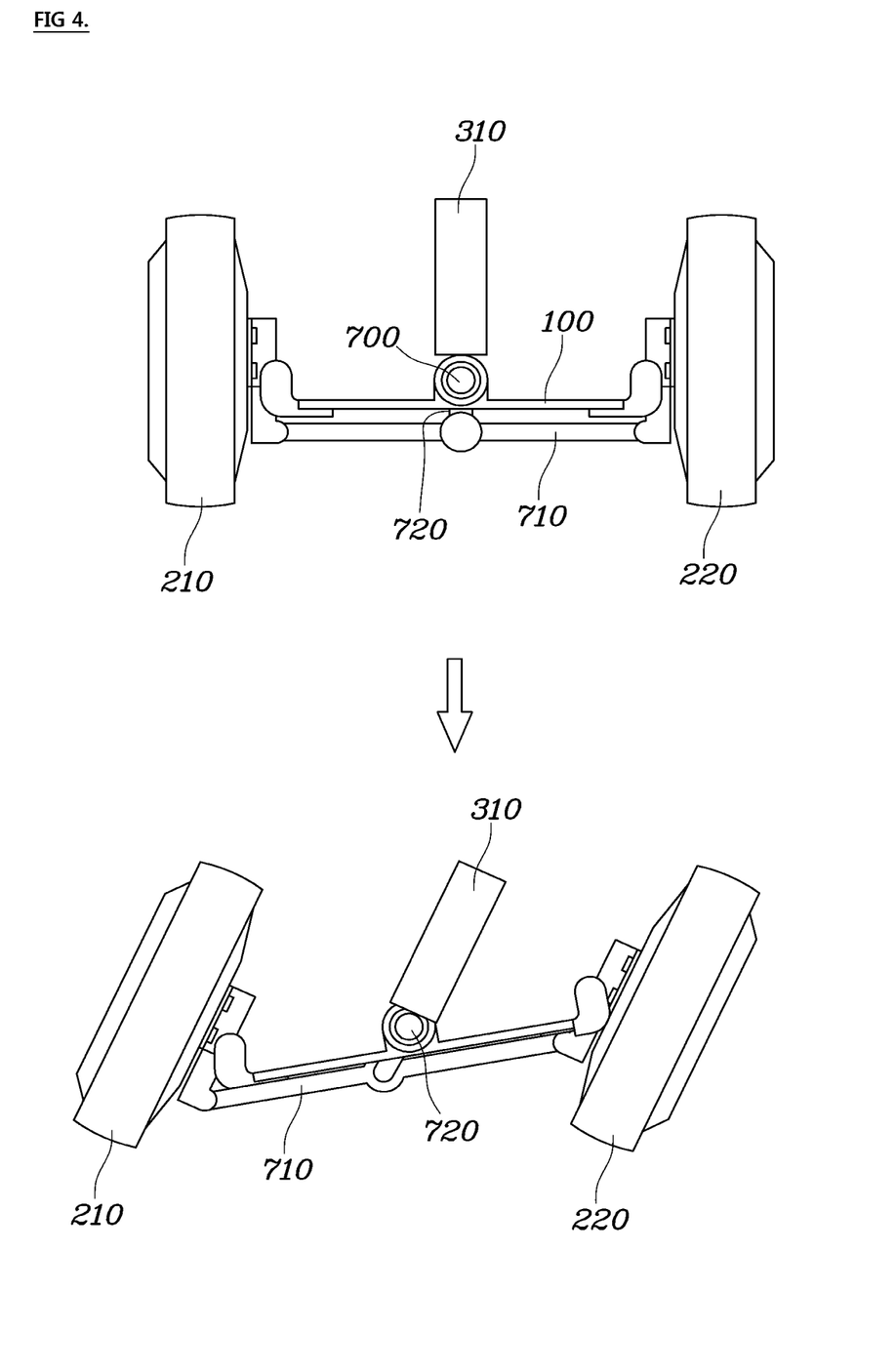
FIG. 4 is a front view illustrating the operation of components associated with steering when the small mobility vehicle turns.

Referring to FIG. 4, the small mobility vehicle in some forms of the present disclosure further includes a driving wheel link 710, which connects a portion biased upwards or downwards from the center of rotation of one of the driving wheels 210 and 220 and a portion biased upwards or downwards from the center of rotation of the other of the driving wheels 210 and 220 so that the driving wheels 210 and 220 are tilted together when the driving wheel link 710 slides laterally, a tilting bar 700, which is rotatably coupled to the footplate 100 and extends in the forward-and-backward direction of the footplate 100, and a link-connecting bar 720, which connects the tilting bar 700 and the driving wheel link 710 to each other. The tilting bar 700 may be coupled to the lower link 310 of the first column unit 300. Therefore, when the first column unit 300 pivots, the tilting bar 700 and the link-connecting bar 720 may rotate, the driving wheel link 710 may slide laterally, and consequently, the driving wheels 210 and 220 may be tilted together.

The driving wheel link 710 is positioned above or under the footplate 100 and connects the driving wheels 210 and 220 to each other. Therefore, when observed from the front, the footplate 100 and the driving wheel link 710, which are connected to the driving wheels 210 and 220, may be embodied as a four-bar link mechanism having a parallelogram structure. Therefore, when the footplate 100 and the driving wheel link 710 slide laterally, the driving wheels 210 and 220 may be tilted together.

The tilting bar 700 may be rotatably coupled to the footplate 100, and may be arranged to extend in the forward-and-backward direction of the footplate 100. The front and rear ends of the tilting bar 700 may be rotatably supported by bearings at the front and rear ends of the footplate 100. In order to prevent the tilting bar 700 from rotating with respect to the footplate 100 when a rotational torque smaller than a predetermined value is applied thereto, the two opposite ends of the tilting bar 700 may be supported by the footplate 100 via elastic members 711 and 712 such as, for example, springs or dampers (refer to FIGS. 2 and 3).

The link-connecting bar 720 connects the tilting bar 700 and the driving wheel link 710 to each other so that the driving wheel link 710 pivots in accordance with the rotation of the tilting bar 700.

The lower link of the first column unit 300 may be coupled to the tilting bar 700, rather than the footplate 100. Accordingly, when the first column unit 300 pivots due to manipulation of the steering handlebars 330 provided at the upper end of the upper link 320 of the first column unit 300, the tilting bar 700 may rotate, and the driving wheel link 710 may pivot due to the link-connecting bar 720 connected to the tilting bar 700. At the same time, the footplate 100 and the driving wheel link 710 may slide laterally, and accordingly, the driving wheels 210 and 220 may be tilted together.

The lower end of the first link 410 of the second column unit 400 may be coupled to the tilting bar 700, rather than the footplate 100. Therefore, when the first column unit 300 pivots, the second column unit 400 may also pivot due to the rotation of the tilting bar 700. Here, the lower link 310 of the first column unit 300 may be coupled to the front end of the tilting bar 700, and the first link 410 of the second column unit 400 may be coupled to the rear end of the tilting bar 700.

Therefore, when the first column unit 300 pivots due to manipulation of the steering handlebars 330, the tilting bar 700 may rotate, and consequently, the driving wheels 210 and 220 and the second column unit 400 may be tilted together, whereby roll-over, which may be caused by centrifugal force when the mobility vehicle turns at a high speed, particularly in the three-wheel driving mode, may be reduced.

As is apparent from the above description, a small mobility vehicle in some forms of the present disclosure is capable of moving freely with a reduced turning radius in a narrow space by folding a second column unit to convert the driving mode into a two-wheel driving mode, and is also capable of stably running at a high speed by unfolding the second column unit to convert the driving mode into a three-wheel driving mode.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A small mobility vehicle comprising:
   a base unit including a footplate and a plurality of driving wheels rotatably mounted on two opposite sides of the footplate;
   a first column unit having a first plurality of links arranged in series such that each link of the first plurality of links is hinged to another link of the first plurality of links, wherein the footplate is coupled to a lower end of a lower link of the first plurality of links and steering handlebars are coupled to an upper end of an upper link of the first plurality of links; and
   a second column unit having a second plurality of links arranged in series such that each link of the second plurality of links is hinged to another link of the second plurality of links, wherein:
   the second column unit is capable of being folded or unfolded as the second plurality of links rotates;
   a lower end of a first link of the second plurality of links is hinged to the footplate; and
   one end of a second link of the second plurality of links is rotatably coupled to an auxiliary wheel that is configured to touch a ground when all of the links of the second plurality of links are unfolded.

2. The small mobility vehicle of claim 1, wherein the small mobility vehicle is configured to:
   travel straight when the driving wheels rotate at the same speed; and
   make a turn when the driving wheels rotate at different speeds.

3. The small mobility vehicle of claim 1, wherein:
   the auxiliary wheel of the second column unit has a motor configured to steer the auxiliary wheel.

4. The small mobility vehicle of claim 1, further comprising:
   a seat provided between the second plurality of links of the second column unit.

5. The small mobility vehicle of claim 1, wherein:
   the first link of the second plurality of links is formed in a curved shape that is bent in a forward direction, wherein an upper end of the first link is extended toward the first column unit when the second column unit is folded.

6. The small mobility vehicle of claim 1, wherein:
the first link of the second plurality of links has a third plurality of links that are configured to extend, and
links of the second plurality of links other than the first link of the second plurality of links are positioned between links of the third plurality of links of the first link when the second column unit is folded.

7. The small mobility vehicle of claim 1, further comprising:
a third link, wherein one end of the third link is connected to the other end of the second link and the third link is configured to lie parallel to the ground when the second column unit is unfolded; and
a fourth link, wherein one end of the fourth link is connected to a portion between an upper end and a lower end of the first link and the other end of the fourth link is connected to the other end of the third link.

8. The small mobility vehicle of claim 7, further comprising:
a seat provided on the upper end of the first link; and
a fifth link configured to support the seat when the second column unit is unfolded, wherein one end of the fifth link is coupled to a portion between the one end of the third link and the other end of the third link, and the other end of the fifth link is coupled to the upper end of the first link.

9. The small mobility vehicle of claim 1, wherein:
when the second column unit is folded, the second column unit is coupled to the first column unit.

10. The small mobility vehicle of claim 9, wherein:
the second column unit is coupled to the lower link of the first column unit.

11. The small mobility vehicle of claim 9, further comprising:
a seat provided between the plurality of the links of the second column unit, wherein, when the second column unit is folded:
the seat is configured to rotate on the links of the second column unit such that the seat is folded or unfolded;
the first column unit is positioned between the seat and the second column unit; and
the seat is coupled to the second column unit.

12. The small mobility vehicle of claim 1, further comprising:
a driving wheel link configured to:
connect the plurality of driving wheels including an upper portion or a lower portion from the center of any of the plurality of driving wheels; and
slide laterally such that the plurality of driving wheels are tilted at the same time;
a tilting bar rotatably coupled to the footplate that is configured to extend in a forward and backward direction of the footplate; and
a link-connecting bar configured to connect the tilting bar and the driving wheel link,
wherein the tilting bar is coupled to the lower link of the first column unit and is configured to rotate along with the link-connecting bar when the first column unit pivots, and wherein the plurality of the driving wheels are tilted when the driving wheel link slides laterally.

13. The small mobility vehicle of claim 12, wherein:
the first link of the second column unit is coupled to the tilting bar, and the second column unit is configured to tilt as the first link of the second column unit tilts.

* * * * *